Feb. 17, 1970     L. M. GUENTHER ETAL     3,496,260

METHOD FOR PRODUCING FIBROUS WEB FROM POLYMER FILM

Filed Dec. 20, 1968     2 Sheets-Sheet 1

INVENTORS
LLOYD M. GUENTHER
GORDON B. JOHNSON
ARTHUR L. MEADER, JR.

BY
ATTORNEYS

United States Patent Office 3,496,260
Patented Feb. 17, 1970

3,496,260
METHOD FOR PRODUCING FIBROUS WEB FROM POLYMER FILM
Lloyd M. Guenther, Orinda, Gordon B. Johnson, Sausalito, and Arthur L. Meader, Jr., Berkeley, Calif., assignors to Chevron Research Company, San Francisco, Calif., a corporation of Delaware
Continuation-in-part of application Ser. No. 540,149, Mar. 31, 1966. This application Dec. 20, 1968, Ser. No. 786,847
Int. Cl. B29d 7/24; B26f 1/20; B65h 35/08
U.S. Cl. 264—156                              8 Claims

ABSTRACT OF THE DISCLOSURE

Process for preparing a fibrous web from a uniaxially oriented flat polymer film of substantially uniform thickness comprising passing the film between the contra-rotating circumferential surfaces of a driven roller covered with regularly spaced, sharp, stiff protrusions, e.g., card clothing, whose peripheral speed is about 2 to 20 times the film speed and a presser roller while applying sufficient pressure to the film with the presser roller to cause the protrusions to puncture the film, thereby cutting elongated slits in the film.

CROSS REFERENCE TO RELATED APPLICATIONS

Figure 1:
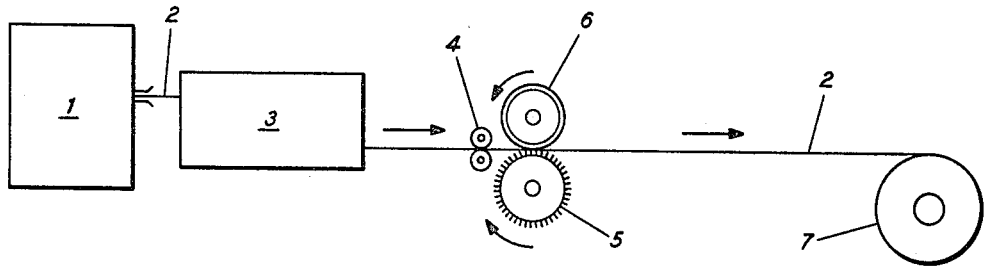

This application is a continuation-in-part of application Ser. No. 540,149, filed Mar. 31, 1966, now abandoned.

FIELD OF INVENTION

This invention pertains to a method for producing a uniform fibrous web from polymer films. The web is useful in making cordage, yarn and other textile products.

BACKGROUND OF INVENTION

Many methods are known by which polymer films can be shredded. Early work done with polyvinyl chloride, polystyrene and the like showed that films of these polymers could be oriented and shredded into individual threads. The films were shredded by mechanical treatments such as grating, turning, twisting or brushing. Later, fibrous materials were made from oriented films by lateral drawing, supersonic vibration and mechanical treatment. One mechanical treatment method shows that vinylidene chloride-acrylonitrile copolymer film can be shredded to a fibrous product by passing it between a revolving long-bristled brush and a stationary long-bristled brush. Recent workers in the art have rejected mechanical treatments as being uncontrollable and have used fluid disintegration, i.e., passing the film over gaseous jets, to get fibrous polymer products.

INVENTION DESCRIPTION

A new method has now been found to make and uniformly control the production of fibrous webs from polymer films. This new method permits the production of a wide selection of textured film products ranging from finely textured fibrous webs suitable for making yarns and other textile products or more coarsely textured webs suitable for making industrial twines, burlapping, carpet backing and the like.

This unique method involves passing a uniaxially oriented polymer film of substantially uniform thickness across the circumferential surface of a driven roller, said surface having a series of offset, sharp, stiff protrusions arranged in a substantially uniform pattern and traveling at a peripheral speed 2 to 20 times the film speed while applying pressure substantially uniformly across the surface of the polymer film opposite that in contact with said protrusions with a body which freely moves tangentially to the film as said body engages the film, said pressure being of sufficient magnitude to cause the protrusions of the driven roller to puncture and penetrate into the film. The portion of the driven roller surface which is in contact with the film travels in the same direction as the film. Since the protrusions are traveling faster than the film they cut elongated slits in the film. In a preferred practical embodiment, the pressure necessary to cause the protrusions of the driven roller to puncture the film is supplied by positioning a contra-rotating presser roller in juxtaposition to the driven roller with its circumferential bearing surface on the passing polymer film.

The general technology for preparing the film used in this process is well known in the art. The polymer is extruded in a conventional slit die extruder to provide a film of desired thickness and width. For convenience, a very wide film may be extruded and then slit and trimmed to the desired width.

The film may be uniaxially oriented by stretching it in the machine-direction at elevated temperatures. The stretch temperatures will depend on the polymer used. The film may be heated to the desired temperature by passing it through a heating zone or over heated rolls or drums. It may be stretched in a single step or in a plurality of steps.

The draw ratios used to orient the film will be ultimately at least about 4:1 and below the ratio which causes the film to fibrillate spontaneously. The ultimate draw ratio in a given instance will depend on the polymer used. For instance, for isotactic polypropylene draw ratios between 6:1 to 10:1, preferably 7:1 to 9:1 are desirable.

The film thickness is chosen to correspond to the fineness desired in the fibrous product. In any instance it will be substantially uniform. As used herein, the term "substantially uniform thickness" means that the thickness of the film does not vary more than about ±10% of the average thickness across its width. Generally, the oriented film thickness will be between 0.5 and 3 mils, preferably 0.7 to 2 mils. Lower thicknesses are used to make fine products with good hand. Higher thicknesses will give coarser products.

The driven roller which contacts the oriented film must be covered with offset, sharp, stiff protrusions arranged in a regular pattern. The distance succeeding protrusions are offset laterally from each other determines the width of the individual fibrils of the web. In other words an individual fibril is formed by the cutting action of successive protrusions. The protrusions have to be sharp enough to be able to readily puncture the film when pressure is applied to the side of the film opposite that contacting the protrusions. They must be stiff enough to cut through the film rather than bend substantially from the force put on them as they cut through the film.

A convenient way to cover the driven roller with uniformly arranged offset protrusions is to helically wrap it with card clothing having stiff, sharp points. The spatial arrangement of the points on the clothing and the degree of helical winding determine the pattern of the web. Different patterns may be achieved by using card clothing with various point arrangements and/or by varying the degree of helical winding. Examples of driven rollers which have been used are a roller wrapped with: a strip of card clothing 1½ inches wide made with No. 24 steel wire staples cut to angular diamond-shaped points which are hardened by tempering—this clothing is described in terms familiar to the textile trade as having 5 rows, 2 twills, 4½ noggs; and a continuous strip of metallic card clothing, which is a wire having a succession of angular points with a spacing of 6⅔ per inch and a thickness of 0.009 inch wrapped at 12 turns per inch.

As indicated previously pressure must be applied substantially uniformly across the surface of the film opposite that contacting the driven roller's protrusions in order to cause the protrusions to penetrate the film and cut a uniform fibrous network in it. Additionally, it was found that the body exerting the pressure, whether fluid or solid, must be able to readily move approximately tangential to the film from the force put on it as it engages the passing film. That is, this body cannot be a stationary means, such as a stationary presser brush.

A preferred means to apply pressure to the film in the present invention is a presser roller. The presser roller will have a substantially uniform surface so that the pressure applied to the film is distributed substantially uniformly. It should be resilient enough to permit the protrusions to readily penetrate its surface. Although presser rollers having continuous surfaces, such as rubber or resilient plastics, can be used it was found that such rollers were abraded by the protrusions on the driven roller. Other rollers having hard surfaces tended to wear down the protrusions on the driven roller. Good results with little wear were obtained using a stiff bristled roller brush. The bristle material may be any of the typical brush materials such as blunt wire, polypropylene, nylon, tampico, and the like. The presser roller may be an idler roller, i.e., free to rotate from the force put on it when it engages the traveling film. Alternatively, the presser roller may be driven at or near the peripheral speed of the driven roll or film.

To get uniform slitting of the film by the protrusions on the driven roller, the peripheral speed of the driven roller is 2 to 20 times greater than the film speed. When the ratio of the peripheral speed of the driven roller to the film speed is 1:1 the protrusions merely perforate the film without slitting it. Ratios between 1.0:1 up to 2:1 may cause the film to break across its width. Such breakage is especially prevalent at ratios between 1:1 and about 1.5:1. Best results in the invention process have been obtained using ratios of about 2:1 to about 15:1.

Figure 2:
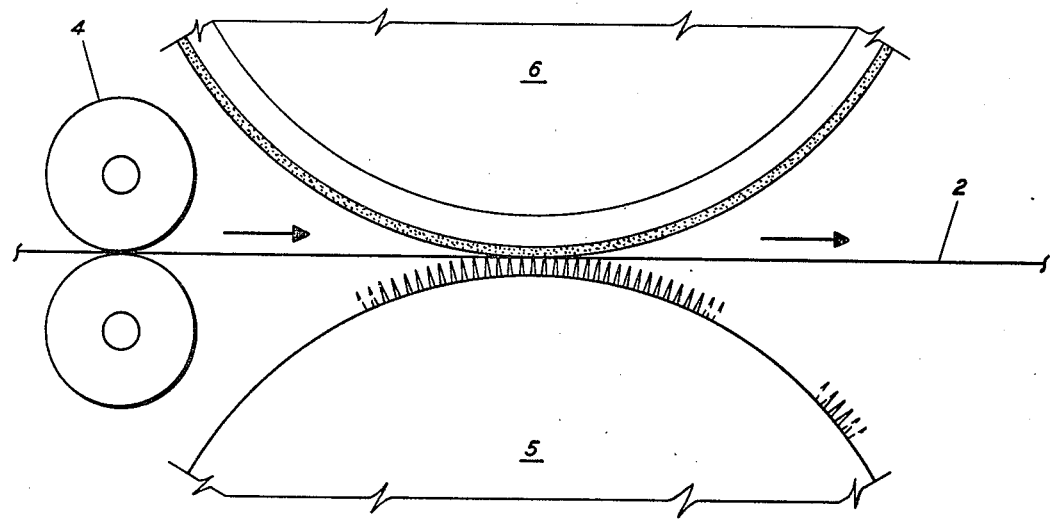

To help in understanding this invention, reference is made to the attached drawings, FIGURES 1 and 2, which describe a practical embodiment of the method and form a part of this application.

FIGURE 1 shows a schematic side view of a system for extruding, orienting, processing the film to a fibrous web and taking up the fibrous product. The film, labelled 2, is extruded and formed at 1. It is then oriented by stretching it at elevated temperatures at 3. After orienting, the film is passed between the control pinch rollers, labelled 4. They "anchor" the film as it is pulled by the driven roller, labelled 5. From the pinch rollers, the film passes between the driven roller and presser roller, labelled 6. The presser roller is lowered until it engages the film and causes the protrusions on the driven roller to puncture the film. The presser roller may be lowered further so that the sharp protrusions penetrate the film to the desired depth. The protrusions on the driven roller, traveling faster than the film, slice through the film and disengage. The film—now a flat fibrous web—is collected on the take-up roller, labelled 7.

FIGURE 2 shows a side view blow-up of the driven roller and pressure roller. As shown, the sharp protrusions on the driven roller puncture the film and slice through it. At the same time theye penetrate the resilient surface of the pressure roller.

Once a web pattern has been fixed with a given set of roller dimensions and a given spatial arrangement of points on the driven roller, the length of the cuts made by the protrusions, and thus the fineness of the fibrous web, may be controlled by operating variables. Referring to FIGURE 2, it may be seen that the length of the slit made by a protrusion will vary with (a) the depth to which the protrusions penetrate the film and (b) the ratio of the peripheral speed of the driven roller to the film speed. In the system shown in FIGURES 1 and 2 the penetration will be approximately the distance the presser roller axis parallel tot he tangential film is lowered after the presser roller first engages the film. In general, as the lengths of the cuts increase, the fibrous products are finer and have a softer hand.

In the process of this invention it may be desirable to apply an antistatic agent to the oreinted film before contacting it with the driven roller. This will keep the individual fibers of the web from spreading out. Antistatic agents and their use are well known in the textile art. Thus, they do not require further explanation or exemplification.

The ratio of peripheral speed to film speed below which the film will break will depend to some extent on the distance between the pinch rollers and the point at which the film contacts the driven roller. By keeping this distance small, i.e., below about 2 feet, ratios as low as about 2:1 may be used.

The following examples further illustrate this unique process. These examples are offered only to illustrate and are not intended to limit the invention described herein.

EXAMPLE 1

Commercial polypropylene chips having an intrinsic viscosity of about 2.5 dl./g. (decalin at 135° C.), a melt flow rate of about 2.5 to 4.0 and an isotacticity of about 95% were fed into a commercial extruder and extruded as a continuous film.

The film was trimmed to 14 in. in width and oriented by stretching it at 270–280° F. The ultimate draw ratio was 8:1. The flat oriented film was 10 inches wide and 1 mil thick.

This oriented film was fed through a set of pinch rollers and then between a driven roller and an idling presser roller. The distance between the pinch rollers and the other rollers was 1.7 feet. The driven roller was 13 in. in diameter and 24 in. wide. It was helically wound with a 1½ in. wide fillet of card clothing of 5 rows, 2 twills, 12 noggs made from No. 28 wire cut to angular points and hardened. The upper pressure roll was 10 in. in diameter and 20 in. wide, assembled from tampico fiber brushes with a bristle length of 2⅞ in. The driven roller was revolving at a speed such that its peripheral speed (measured as though the points on the clothing were the periphery) was 460 feet per minute. The film was traveling at 153 feet per minute just above the driven roller. The presser roller was lowered until it engaged the film and caused the points on the driven roller to puncture through the film. A penetration of 31 mils produced a flat, uniform fibrous web.

Figure 3:
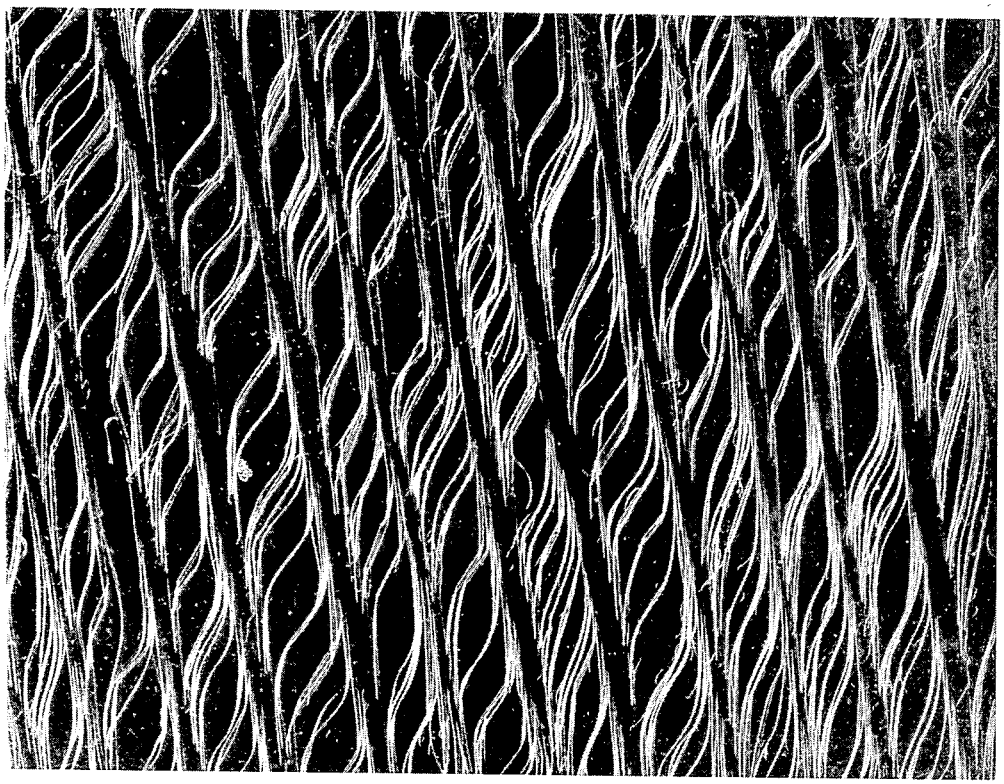

This fibrous web is illustrated by the attached photograph, labelled FIGURE 3, which is a part of this application. As shown the web is spread out and enlarged about four-fold. The uniformity and web-like characteristics of the product are apparent. As can be seen, the products made by this invention have a definite predictable pattern of slits which form fibrils running in the machine direction which are joined by sloping ribs as opposed to the random networks made by crushing films or distintegrating them by means of fluids.

The fibrous product of Example 1 was twisted into an industrial-type twine. Its tensile strength was 31,300 p.s.i.

In a manner similar to that of Example 1 other films were made into fibrous webs and twisted into twines. The following tables gives the particulars of these runs and the strength of the twines obtained. The "Carding ratio" is the ratio of the peripheral speed of the driven roller to the speed of the film.

TABLE I

| Ex. No. | Polymer | Total Draw ratio | Oriented film thickness, mils. | Film speed, ft./min. | Driven roller [2] Covering No. | Driven roller [2] Peripheral speed, ft./min. | Presser roller [3] covering No. | Penetration, mils | Twine strength, K p.s.i. | Carding ratio |
|---|---|---|---|---|---|---|---|---|---|---|
| 2 | PP | 7.6 | 1 | 83 | 1 | 248 | 2 | | 42.5 | 3.0 |
| 3 | PP | 7.6 | 1 | 30 | 1 | 248 | 2 | | 29.2 | 8.3 |
| 4 | PP | 7.6 | 1 | 12 | 1 | 248 | 2 | | 23.3 | 20.6 |
| 5 | PP | 5.0 | 1 | 75 | 1 | 440 | 3 | | 26.1 | 5.9 |
| 6 | PP | 10.0 | 2 | 13.5 | 1 | 110 | 2 | | 20.9 | 8.1 |
| 7 | PP | 6.6 | 0.5 | 66 | 1 | 440 | 2 | | 38.2 | 6.7 |
| 8 | PP | 7.5 | 1 | 75 | 1 | 440 | 2 | | 30.1 | 5.9 |
| 9 | PE | 7.25 | 0.8 | 72 | 1 | 440 | 2 | | 24.1 | 6.1 |
| 10 | PE | 4.0 | 1.2 | 50 | 1 | 440 | 2 | | 10.6 | 8.8 |
| 11 | EP | 7.85 | 1.0 | 79 | 1 | 440 | 2 | | 32.6 | 5.6 |
| 12 | 4MP1 | 5.0 | 3.2 | 50 | 1 | 440 | 2 | | 12.7 | 8.8 |
| 13 | 4MP1 | 7.0 | 1.9 | 70 | 1 | 440 | 2 | | 19.8 | 6.3 |
| 14 | PP/N6 (90/10) [1] | 7.0 | 2.0 | 140 | 4 | 560 | 2 | | 34.0 | 4.0 |
| 15 | PP/N6 (75/25) [1] | 7.0 | 2.2 | 140 | 4 | 560 | 2 | | 27.9 | 4.0 |
| 16 | PP/SAN (95/5) [1] | 8.1 | 1.8 | 160 | 5 | 345 | 6 | | 49.5 | 2.1 |

[1] Indicates wt. ratio of physical mixture.
[2] 6.5 in. diameter.
[3] 3 in. diameter, except Ex. No. 16.
Covering No. 1—1½ in. fillet 5R-2T-12N, No. 28 angular diamond points 3/32 in. protrusion.
Covering No. 2—1½ in. fillet 6R-3T-19N, No. 30 hardened points 0.380 in. over-all.
Covering No. 3—1½ in. stainless steel circular wire brush.
Covering No. 4—1½ in. fillet 5R-2T-12N, No. 34 angular diamond points 3/32 in. protrusion.
Covering No. 5—1½ in. fillet 5R-2T-4½N, No. 24 Angular diamond points 3/32 in. protrusion.
Covering No. 6—Tampico fiber brush, 2 in. long bristles, mounted on a 2 in. diameter roller.
PP=Polypropylene (MFR=2.5-4.0, about 95% isotactic); PE=Polyethylene (density 0.960 g./l.); EP=Ethylene-propylene copolymer; 4MP1=Poly-4-methyl-1-pentene; N6=Nylon 6, i.e., polycaprolactam; SAN=Styrene-acrylonitrile copolymer.

The following examples illustrate the effect of increasing the penetration in this process. As the penetration increases the twine strength decreases. Twine strength is related to the fineness of the fibrous web.

TABLE II

| Ex. No. | Polymer | Total draw ratio | Oriented film thickness, mils | film speed, ft./min. | Driven roller [1] Covering No.[3] | Driven roller [1] Peripheral speed, ft./min. | Presser roller, covering No.[2] | Penetration, mils | Twine strength, K p.s.i. | Carding ratio |
|---|---|---|---|---|---|---|---|---|---|---|
| 17 | PP | 8.1 | 1.0 | 154 | 1 | 465 | 7 | 12 | 40.7 | 3.0 |
| 18 | PP | 8.1 | 1.0 | 154 | 1 | 465 | 7 | 18 | 38.8 | 3.0 |
| 19 | PP | 8.1 | 1.0 | 154 | 1 | 465 | 7 | 30 | 31.3 | 3.0 |
| 20 | PP | 8.1 | 1.0 | 154 | 1 | 465 | 7 | 36 | 30.2 | 3.0 |
| 21 | PP | 8.1 | 1.0 | 154 | 1 | 465 | 7 | 42 | 25.7 | 3.0 |
| 22 | PP | 8.1 | 1.0 | 154 | 1 | 465 | 7 | 48 | 23.8 | 3.0 |
| 23 | PP | 8.1 | 1.0 | 154 | 1 | 465 | 7 | 51 | 21.2 | 3.0 |

[1] 13 in. diameter.
[2] Covering No. 7—Tampico fiber brush, 2⅞ in. long bristles, mounted on a 4¼ in. diameter roller.
[3] See Table I.
PP=Polypropylene (MFR=2.5-4.0, about 95% isotactic).

The following examples show how the carding ratio affects the fibrous product. As the carding ratio increases the twine strength decreases.

TABLE III

| Ex. No. | Polymer | Total draw ratio | Oriented film thickness, mils | film speed, ft./min. | Driven roller [1] Covering No.[3] | Driven roller [1] Peripheral speed, ft./min. | Presser roller, covering No.[2] | Penetration, mils | Twine strength, K p.s.i. | Carding ratio |
|---|---|---|---|---|---|---|---|---|---|---|
| 24 | PP | 8.0 | 1.0 | 154 | 1 | 231 | 7 | 36 | 40.6 | 1.5 |
| 25 | PP | 8.1 | 1.0 | 154 | 1 | 463 | 7 | 36 | 33.4 | 3.0 |
| 26 | PP | 8.1 | 1.0 | 154 | 1 | 900 | 7 | 36 | 30.3 | 5.9 |

[1] 13 in. diameter. [2] See Table II. [3] See Table I. PP=Polypropylene (MFR=2.5-4.0, about 95% isotactic).

From the above examples, it is apparent that this process may be applied to a wide variety of orientable partially crystalline hydrocarbon polymers and copolymers such as polypropylene, high density polyethylene, ethylene-propylene copolymer and poly-4-methyl-1-pentene, polyesters, polyamides and other crystalline orientable polymers or mixtures thereof. Also, the polymers may contain additives such as U.V. stabilizers, plasticizers, antioxidants, heat stabilizers, dye acceptors, pigments, dyes and the like.

What is claimed is:

1. Method for processing a polymer film to produce a flat fibrous web product which comprises passing a uniaxially oriented polymer film of substantially uniform thickness across the circumferential surface of a driven roller, said surface having a series of offset, sharp, stiff protrusions arranged in a substantially uniform pattern and traveling at a peripheral speed 2 to 20 times the speed of the film while applying pressure substantially uniformly to the side of the film opposite that in contact with the protrusions with a body which moves approximately tangential to the film as said body engages the film, said pressure being of sufficient magnitude to cause the protrusions to puncture the film, thereby cutting elongated slits in the film.

2. Method for processing a polymer film to a flat fibrous web product which comprises passing a uniaxially oriented polymer film of substantially uniform thickness between the contra rotating circumferential surfaces of a driven roller and a presser roller, and across said circumferential surface of the driven roller, said circumferential surface of the driven roller having a series of sharp, stiff, offset protrusions arranged in a substantially uniform pattern and traveling at a peripheral speed of 2 to 20 times the film speed, while applying sufficient substantially uniform pressure to the side of the film opposite that in contact with the protrusions with said circumferential surface of the presser roller to cause the protrusions to puncture the film, thereby cutting elongated slits in the film.

3. Method of claim 2 wherein the peripheral speed of the circumferential surface of the driven roller is 2 to 15 times the film speed.

4. The method of claim 2 wherein the polymer is isotactic polypropylene, high-density polyethylene, ethylene-propylene copolymer, poly-4-methyl-1-pentene, a physical mixture of polypropylene and polycaprolactam or a physical mixture of polypropylene and styrene-acrylonitrile copolymer.

5. The method of claim 2 wherein the polymer is isotactic polypropylene and the film is uniaxially oriented at a draw ratio of about 6:1 to 10:1.

6. The method of claim 2 wherein the draw ratio is about 7:1 to 9:1, and said peripheral speed is 2 to 15 times the film speed.

7. Method of claim 2 wherein the oriented film thickness is about 0.5 to 3 mils.

8. Method of claim 2 wherein the oriented film thickness is 0.7 to 2 mils.

References Cited

UNITED STATES PATENTS

| | | |
|---|---|---|
| 2,853,741 | 9/1958 | Costa. |
| 3,273,771 | 9/1966 | Beaumont. |
| 3,302,501 | 2/1967 | Greene. |
| 3,369,435 | 2/1968 | Boultinghouse. |

DONALD J. ARNOLD, Primary Examiner

A. M. SOKAL, Assistant Examiner

U.S. Cl. X.R.

264—147; 83—30; 225—3